United States Patent [19]
Kunt et al.

[11] Patent Number: 5,524,933
[45] Date of Patent: Jun. 11, 1996

[54] METHOD FOR THE MARKING OF DOCUMENTS

[75] Inventors: Murat Kunt, Grandvaux; Joseph Bigün, Renens; Benoît Duc, Ecublens, all of Switzerland

[73] Assignee: Ecole Polytechnique Federale de Lausanne, Lausanne, Switzerland

[21] Appl. No.: 190,021

[22] PCT Filed: May 26, 1993

[86] PCT No.: PCT/CH93/00135

§ 371 Date: Jan. 28, 1994

§ 102(e) Date: Jan. 28, 1994

[87] PCT Pub. No.: WO93/25038

PCT Pub. Date: Dec. 9, 1993

[30] Foreign Application Priority Data

May 29, 1992 [CH] Switzerland .............................. 1732/92

[51] Int. Cl.⁶ .................................................. B42D 15/00

[52] U.S. Cl. ......................................................... 283/67
[58] Field of Search ............................... 283/94, 93, 902, 283/67, 114, 901, 72

[56] References Cited

U.S. PATENT DOCUMENTS

4,582,346  4/1986  Caprio ..................................... 283/094

Primary Examiner—Willmon Fridie, Jr.
Attorney, Agent, or Firm—Clifford W. Browning; Woodard, Emhardt, Naughton, Moriarty & McNett

[57] ABSTRACT

A mark is incorporated to the original during the fabrication of said original in such a way that said mark is invisible on the original but appears on the copy of the original which is made by using a photocopying machinge. The mark is incorporated by additionally mixing the original image to be protected and the marking image to be concealed in the original by modulating one or the other of the images or by manipulation of Fourier transforms.

11 Claims, 5 Drawing Sheets

METHOD FOR THE MARKING OF DOCUMENTS

BACKGROUND OF THE INVENTION

The present invention is concerned with a method for the marking of documents, which is intended to avoid confusion of copies with originals.

At any time one finds oneself confronted with the need of reproducing documents and not so very long ago numerous documents were drawn up in a number of copies printed by means of carbon paper. The appearance on the market of photocopiers has confused the data of this problems to the extent that it has become possible to reproduce a finished document with practically the same quality as the original.

Whereas with the black/white photocopiers first available on the market an original was distinguished without difficulty from a copy because on the one hand of the quality of the copy and on the other hand of the quality of the paper to be utilised for the photocopy, the development of the technique has enabled documents to be reproduced on practically any kind of backing paper with a nearly perfect quality.

However, in the case of black/white photocopiers it always remained possible to distinguish the original from the copy when the original was in colour.

Now, the availability of photocopiers which enable colours to be reproduced has again marked important technical progress. At the start, as had been the case for black/white copiers, very special paper had to be utilised for the reproduction of the colours. Today, however, the latest technique enables backing paper of no matter what kind to be utilised. Thus it has become extremely difficult to distinguish an original from a good-quality copy since on the one hand the drawings and colours are reproduced with great fidelity and on the other hand the very nature of the paper can no longer serve as a criterion of the distinction between an original and a copy.

Technicians and users are obviously pleased with this new quality in the industry of graphic reproduction. This very technical quality is, however, dangerous when its exploitation is employed with an illicit or dishonest aim.

In the first place one certainly thinks of bank notes which may be reproduced in colours on paper presenting a grain which may obviously be confused with the original grain of the money paper. The falsification of documents by photocopies touches yet again, however, upon a much vaster field of documents. It is enough to think about all the securities and the whole of the documents which give a right to the delivery of an allowance, in whatever form this may be.

Consequently it has been possible to see an increasing number of attempts at falsifications, which are the more difficult to detect, the greater the progress made in the technique of reproduction.

As a consequence of this development the relatively complicated character of the graphical features of certificates of securities, stocks, as well as notes, which was the main guarantee of their originality, no longer or practically no longer assumes this function since it becomes ever more easy for anyone to reproduce them if ever he disregards his scruples.

Now, in order not to modify the fundamental rules of commerce an extremely great interest exists in being able in spite of the existence of the most highly perfected photocopiers, to continue to employ trustworthy original documents without permanently having afterthoughts as to their original character or not.

SUMMARY OF THE INVENTION

The aim of the present invention is in fact to propose a method the application of which enables a photocopy to be distinguished from an original with certainty, even when the photocopy has been executed by a photocopier of the most sophisticated type.

In this view the invention is concerned with a method for the marking of documents, in accordance with which when drawing up the original document a mark is incorporated into the said original document by digitally combining the data relative to this mark with the data relative to the image to be protected, in such a way that this mark is invisible on the original document but appears on the copy of this original document produced by means of a photocopier, the digitalization of the original document being effected with a sampling pitch at least twice finer than that of the photocopier.

Other important characteristics of the invention will be evident from the following detailed description.

Hence the method in accordance with the present invention intervenes at the level of the data which must be integrated into the document, by digitally combining the data for concealment and the data of the image to be protected before the printing of the document, without changing the printing procedure, contrary to the methods which have been proposed hitherto and which in general call upon different ways of printing the original data, either by a mixture of different colours in order to effect a marking of the document, or by effecting the marking by photographic printing.

This method enables marking data to be incorporated into the originals, this data being invisible on the originals and appearing solely after photocopying. It depends upon the fact that the photocopies obtained with even the most modern photocopiers, have a weaker definition of the document (in general by a factor of 2) than the originals which have been printed.

It is of course probable that the technique of photocopiers will continue to progress so as to refine still further the definition of the document. It will then be sufficient to print with still greater definition the originals that it is desired to protect.

Theorem of Bidimensional Sampling

The brightness of a document (the levels of gray or black on white) may be represented by a bidimensional analogue function $x_a(u,v)$. For images in colour the data is represented by three functions of the same type for the primary colours red, green and blue. When such a document is scanned by the analysing system of a photocopier or any other equipment, this or these functions are sampled in space with a very fine pitch which should normally be chosen in accordance with the theorem of bidimensional sampling (see M. Kunt, "Traitement numérique des signaux" (Digital treatment of signals), Traité d'électricité (Treatise on electricity), EPFL, Vol. XX, 402p.). Taking into account the difficulties of applying this theorem in practice, the sampling pitch is in general chosen to be sufficiently small for the digitally reconstituted document not to present a dotted effect to the eye of the observer. Current photocopiers employ sampling which varies between 300 and 600 dots per inch, that is to say, dots of the order of 0,042 mm to 0,085 mm in width. It is this which enables them to have a good quality of reproduction. The sampling theorem says that any motif in the original the fineness of which is less than double these values cannot be correctly represented.

Let $X_a(f,g)$ be the Fourier transform of the function $X_a(u,v)$. Sampling the function $X_a(u,v)$ causes periodic repetition of the Fourier transform $X_a(f,g)$ in the two directions, with periods equal to the inverse of twice the spatial sampling periods, which will be called $\delta u$ and $\delta v$. If the original document contains components at frequencies higher than $\frac{1}{2}\delta u$ and/or $\frac{1}{2}\delta v$, the repeated versions of the function $X_a(f,g)$ overlap and an overlapping effect takes place. This overlapping is the origin of the moiré effect which is observed in certain copied documents.

The present invention is based upon this overlapping and implies that the original should have a definition at least twice better than that of the photocopiers.

BRIEF DESCRIPTION OF THE DRAWINGS

The description which follows, given by way of example, refers to the drawing in which.

DESCRIPTION OF THE PREFERRED EMBODIMENTS

Figures 1A, 1C:
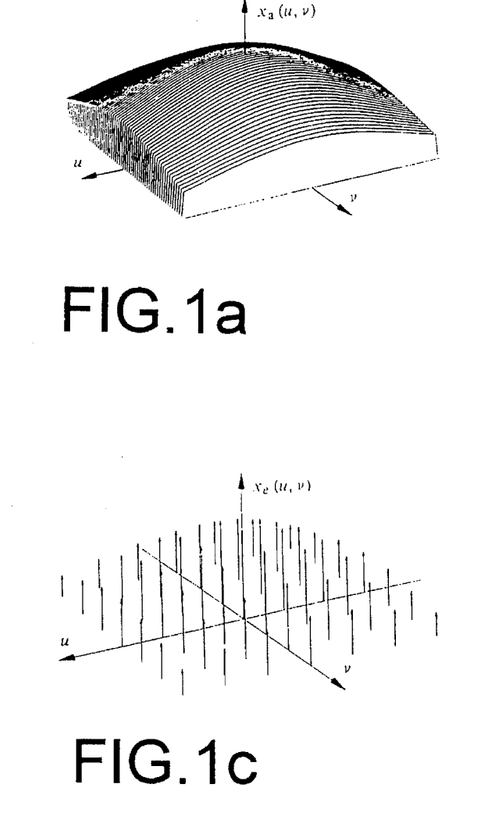
FIGS. 1a to 1e illustrate the different stages of sampling.
Figures 1B, 1D:
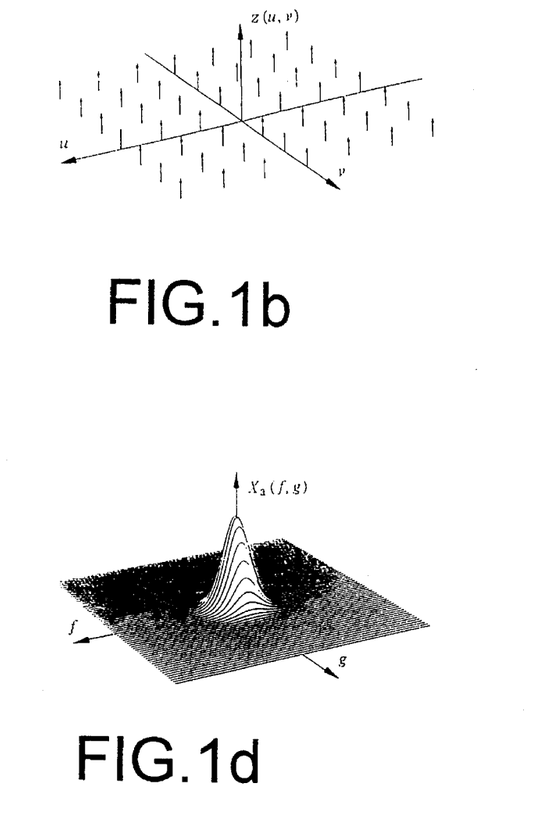
Figure 1E:
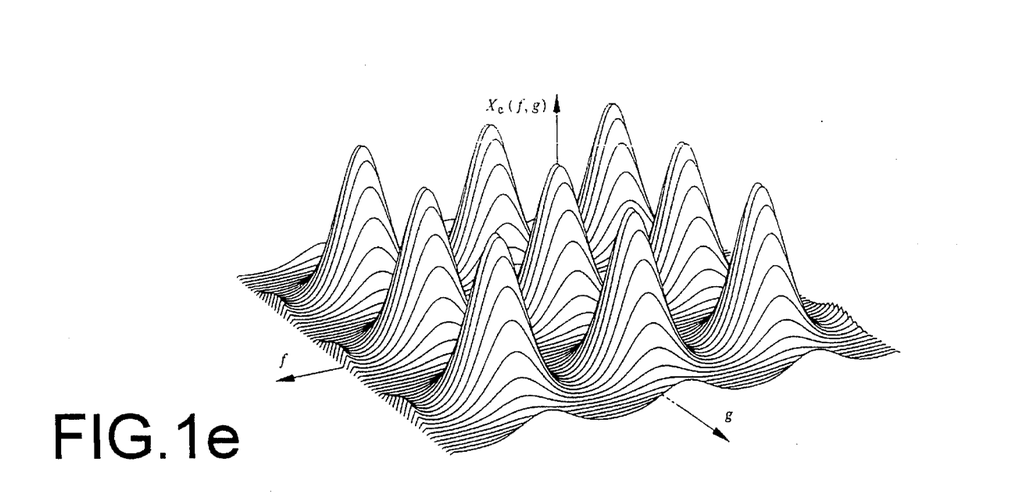

FIG. 1 shows the different stages of sampling. FIG. 1a is a representation of the $x_a$ function representing the brightness of an image. FIG. 1b is a representation of the sampling function. FIG. 1c illustrates the multiplication of the functions represented in the first two Figures. FIG. 1d represents the Fourier transform of the original image and FIG. 1e represents the Fourier transform after sampling.

Marking Images

Figure 2:
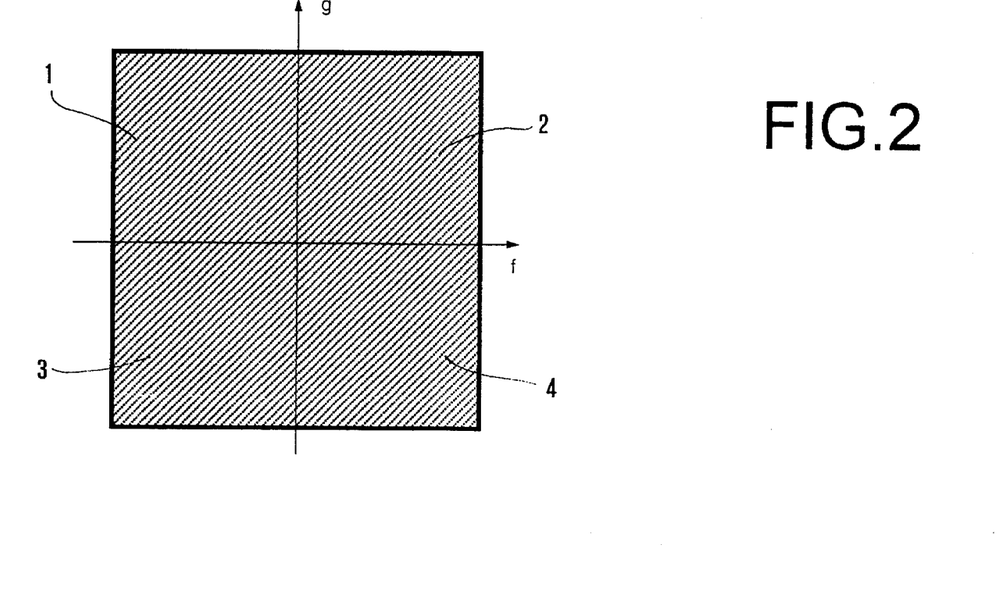
FIG. 2 represents the four quadrants of the discrete Fourier transform of the marking image.

The method of the invention consists indeed in introducing into the original document when drawing it up, one or more marking images the components of which will be placed at frequencies higher than those of the photocopier so that the said marking image or images are invisible on the original but appear on photocopies. The user is free to choose the marking image which he desires to cause to appear on the photocopy. Such image may, for example, be that of a text which says "This is a copy" or "This is a fake banknote". The marking image may equally well be any image at the levels of gray or in colour. This image is digitalized when drawing up the original document, with a sampling pitch comparable with that of the photocopiers. Its discrete bidimensional Fourier transform is calculated and represented also in digital form. FIG. 2 illustrates the four quadrants 1 to 4 of the discrete Fourier transform of the marking image.

Preparation of the Original Document

The original document in image form must be digitalized with a pitch in any case twice as fine as that of the best photocopier. The factor 2 is not critical; any higher value is suitable.

The protection of the document by the introduction of the invisible marking image on the original may be effected in accordance with two equivalent methods, the spatial method and the frequential method. Three variants for each of them will be described below by way of example.

1. The Spatial Method

Figure 3:
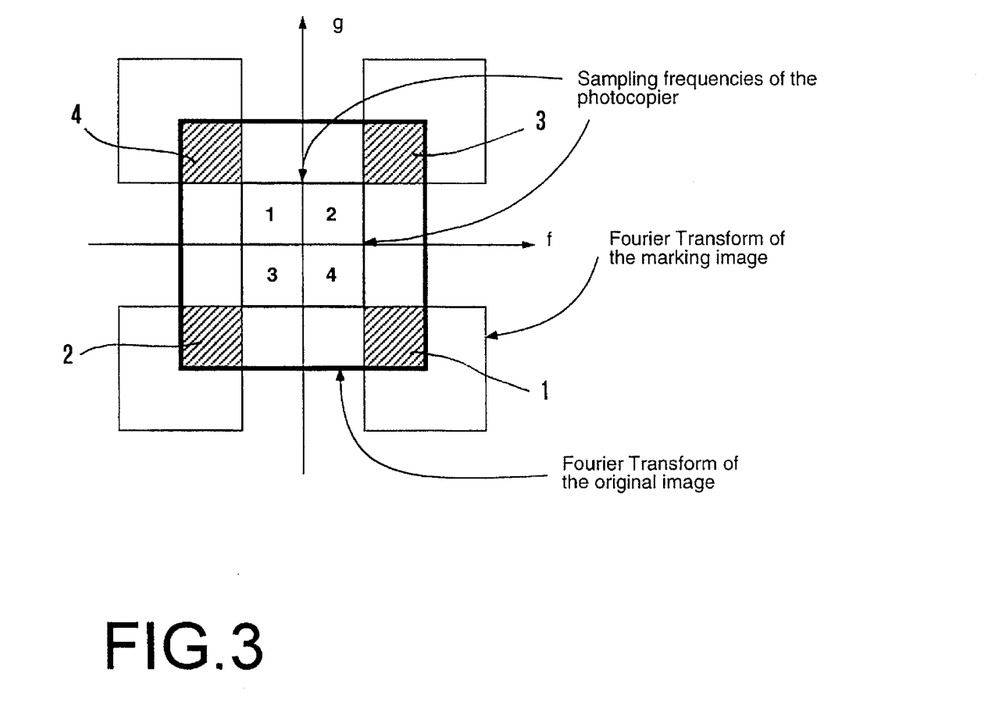
FIG. 3 illustrates the arrangement of the Fourier transforms so as to place the marking image in the high frequencies.
Figure 4:
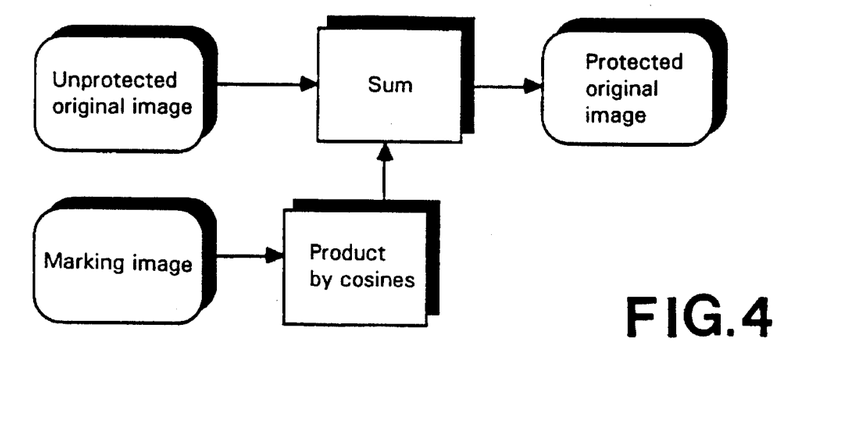
FIG. 4 is a block diagram of a first variant upon the method of marking the original image in the spatial domain.

In accordance with a first variant upon the spatial method, it is a question of calculating a new function $y(k,l)$ where k and l represent the indices of the discrete points after digitalization, by adding to the digitalized image of the initial unprotected original document $x(k,l)$ the marking image $z(k,l)$ multiplied by cosine and sine functions judiciously chosen in order to place the marking image in the high frequencies in the manner illustrated in the Fourier domain in FIG. 3. In case of the unidimensional signals of radio communication, this operation is known under the name of amplitude modulation. The exact form of this operation is:

$$y(k,l) = x(k,l) + z(k,l) \left\{ \cos\left[\pi\left(\frac{k}{\delta u} + \frac{l}{\delta v}\right)\right] + \cos\left[\pi\left(\frac{k}{\delta u} - \frac{l}{\delta v}\right)\right] \right\} \quad (1)$$

where $\delta u$ and $\delta v$ are the sampling periods along the two axes of the original image. A block diagram of this variant upon the method is represented in FIG. 4. In this first variant the marking image does not replace the original image but becomes superimposed upon it.

Figure 5:
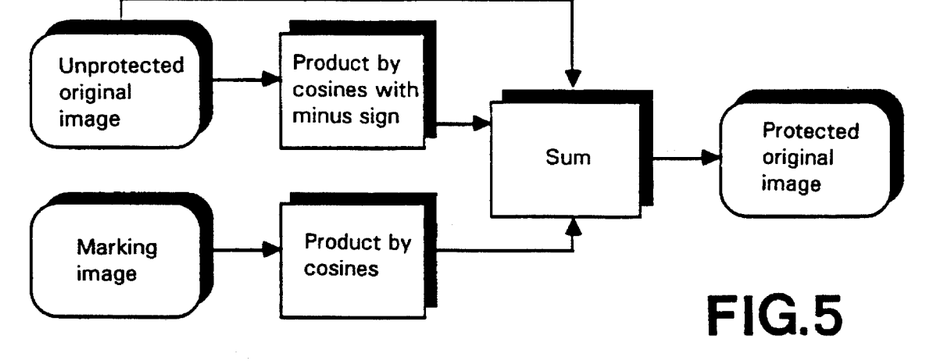
FIG. 5 is a block diagram of a second variant upon the method of marking the original image in the spatial domain.

In accordance with a second variant upon the spatial method it is possible to replace the original image by the marking image almost totally. In this second variant it is a question of hiding a version of the original in the high frequencies in order that after photocopying only the marking image appears. For this purpose the modulated version of the original is subtracted. Hence the corresponding equation for the calculation is:

$$y(k,l) = x(k,l) + [z(k,l) - x(k,l)] \left\{ \cos\left[\pi\left(\frac{k}{\delta u} + \frac{l}{\delta v}\right)\right] + \cos\left[\pi\left(\frac{k}{\delta u} - \frac{l}{\delta v}\right)\right] \right\} \quad (2)$$

A block diagram of this variant upon the method is represented in FIG. 5.

Figure 6:
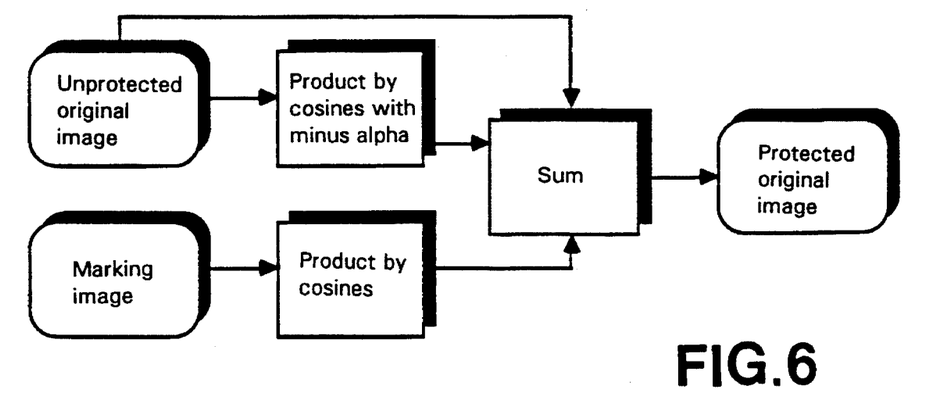
FIG. 6 is a block diagram of a third variant upon the method of marking the original image in the spatial domain.

In accordance with a third variant upon the spatial method, lying between the two preceding variants, it is possible to weight the original image with respect to the marking image. In this third variant it is likewise a question of hiding a weighted version of the original image in the high frequencies so that after photocopying one can determine the level of the appearance of the marking image at discretion. For doing this the modulated and weighted version of the original is subtracted. Hence the corresponding equation for the calculation is:

$$y(k,l) = x(k,l) + [z(k,l) - \alpha x(k,l)] \left\{ \cos\left[\pi\left(\frac{k}{\delta u} + \frac{l}{\delta v}\right)\right] + \cos\left[\pi\left(\frac{k}{\delta u} - \frac{l}{\delta v}\right)\right] \right\} \quad (3)$$

where $\alpha$ is a weighting factor. If $\alpha=0$ one falls back onto the first variant above, whereas if $\alpha=1$, one falls back onto the second variant.

Depending upon importance that one desires to accord the marking image one may equally well introduce a multiplying factor $\beta$ before the function z(k,l) in Equation (3). A block diagram of this variant upon the method is represented in FIG. 6.

It is of course possible without difficulty and without departing from the scope of the present invention to realize numerous other variants upon the method, in which a mark is incorporated into the original by mixing additively the original image which is to be protected and the marking image which is to be concealed in the original, whilst modulating the two images.

2. The Frequential Method

Figure 7:
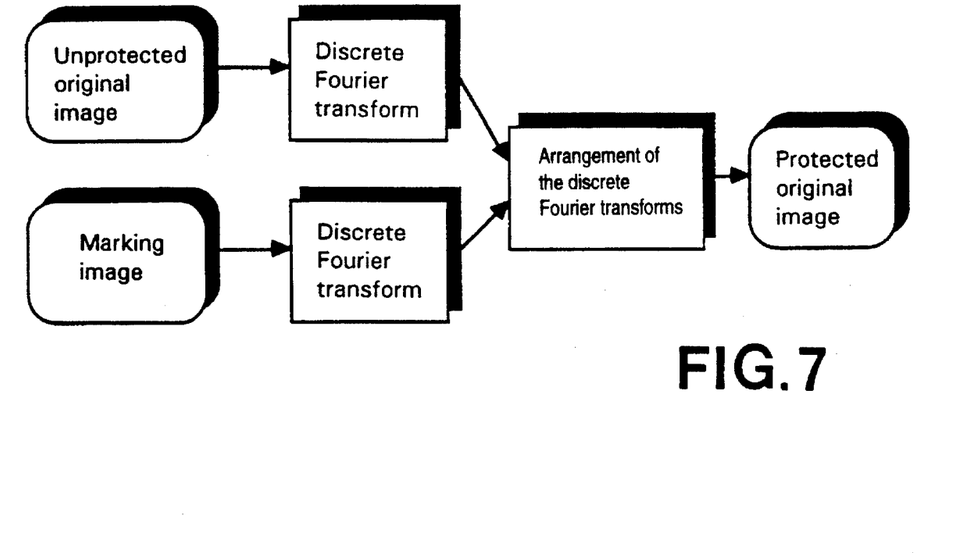
FIG. 7 is a block diagram of a first variant upon the method of marking the original image in the frequency domain.

In accordance with a first variant upon the frequential method it is sufficient to distribute the quadrants of the Fourier transform of the marking image of FIG. 2 in accordance with the locations indicated in FIG. 3 (shaded portions) and to add the corresponding values to the Fourier transform of the unprotected original image. It is then sufficient to take the inverse Fourier transform of this resultant image in order to obtain the protected image. A block diagram of the method in accordance with this variant is represented in FIG. 7.

Figure 8:
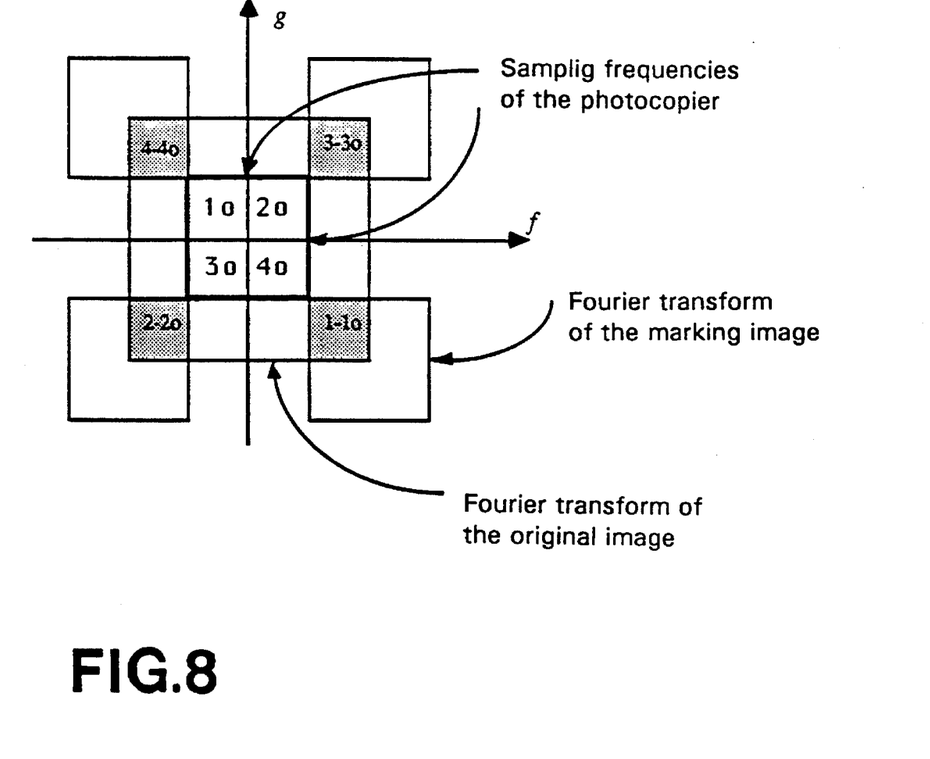
FIG. 8 illustrates the distribution of the quadrants of the Fourier transform for the execution of the method in accordance with a second variant in the frequency domain.
Figure 9:
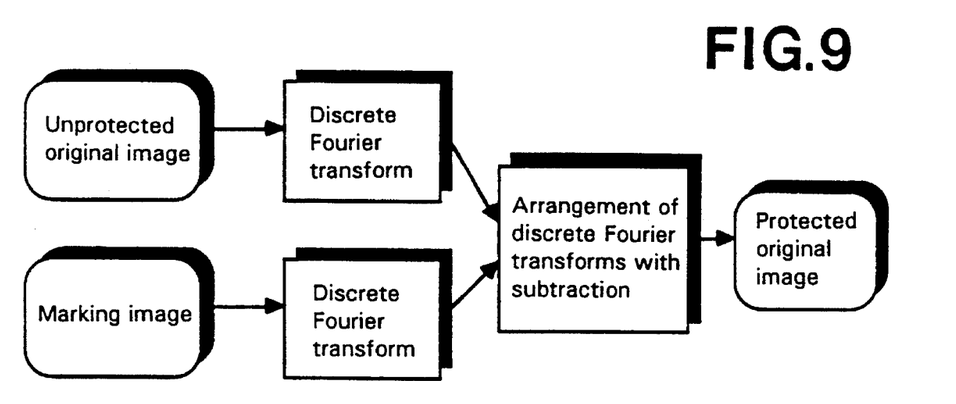
FIG. 9 is a block diagram of the second variant upon the method of marking the original image in the frequency domain.

In accordance with a second variant upon the frequential method, one distributes the quadrants 1 to 4 of the Fourier transform of the marking image of FIG. 2 in accordance with the locations indicated in FIG. 8, by subtracting from them the corresponding quadrants 1*o*, 2*o*, 3*o* and 4*o* of the Fourier transform of the original image (shaded portions). The corresponding values must then be added to the Fourier transform of the unprotected original image. Finally it is sufficient to take the inverse Fourier transform of this resultant image in order to obtain the protected image. A block diagram of the method in accordance with this second variant upon the frequential method is represented in FIG. 9.

Figure 10:
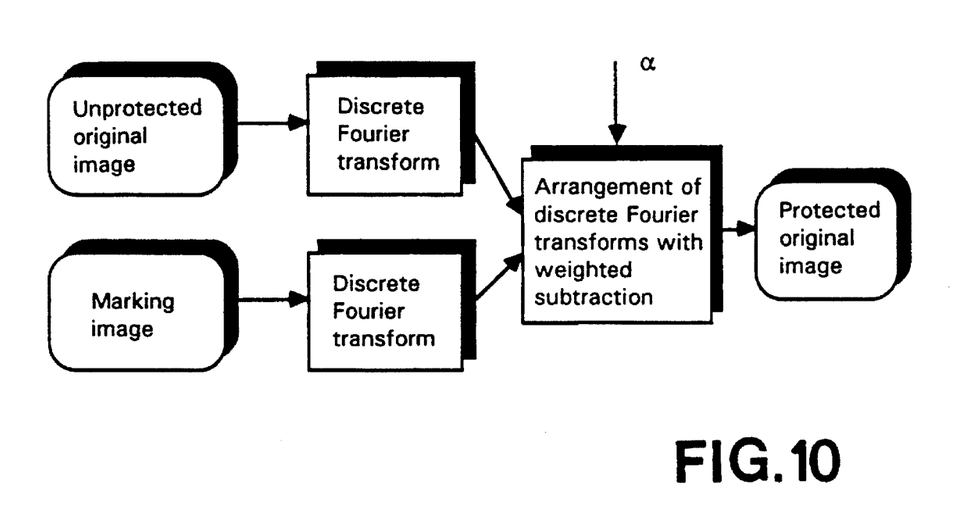
FIG. 10 is a block diagram of a third variant upon the method of marking the original image in the frequency domain.

In accordance with a third variant upon the frequential method the quadrants of the Fourier transform of the marking image of FIG. 2 are distributed in accordance with the locations indicated in FIG. 8, by subtracting from them the corresponding quadrants, weighted by $\alpha$, of the Fourier transform of the original image (shaded portions). The factor $\alpha$ is the same as that of Equation (3). The corresponding values must then be added to the Fourier transform of the unprotected original image. Finally it is sufficient to take the inverse Fourier transform of this resultant image in order to obtain the protected image. A block diagram of the method in accordance with this third variant upon the frequential method is represented in FIG. 10.

As in the case of the spatial method it is of course possible without difficulty and without departing from the scope of the present invention, to realize numerous other variants upon the method in which a mark is incorporated into the original by mixing additively the original image to be protected and the marking image which is to be concealed in the original by a Fourier transform manipulation.

We claim:

1. A method for the marking of documents, said documents consisting in digitized images of black and white, grey and/or colour types, wherein a digitized mark image is intimately mixed together with the original digitized image by means of a digital operation producing a modified digital image which occupies the same portion of surface as the original image, each grey or colour value in the modified digital image being expressed as a function of the grey or colour values of the original image and of the mark image, in such a way that the mark is not noticeable in the modified image to the human eye but appears on the copy of this original document produced by means of a photocopier, the digitalization of the original document being effected with a sampling pitch at least twice finer than that of the photocopier.

2. A method as in claim 1, characterised in that the mark is incorporated by mixing additively the original image which is to be protected and the marking image which is to be concealed in the original, whilst modulating one or other of the images.

3. A method as in claim 2, characterised in that the mark is incorporated into the original by mixing additively the original image and the marking image, by adding the samples of the two images after previous multiplication of the marking image in accordance with the following Equation;

$$y(k,l) = x(k,l) + z(k,l) \left\{ \cos\left[\pi\left(\frac{k}{\delta u} + \frac{l}{\delta v}\right)\right] + \cos\left[\pi\left(\frac{k}{\delta u} - \frac{l}{\delta v}\right)\right] \right\}$$

where k and l represent the indices of the discrete points after digitalization, x(k,l) represents the digitalized image of the initial unprotected original document, z(k,l) represents the marking image, and $\delta u$ and $\delta v$ are the sampling periods along the two axes of the original image.

4. A method as in claim 2, characterised in that the mark is incorporated into the original by mixing additively the original image and the marking image, by adding the samples of the two images after previous multiplication of the marking image and of the original image in accordance with the following Equation;

$$y(k,l) = x(k,l) + [z(k,l) - x(k,l)] \left\{ \cos\left[\pi\left(\frac{k}{\delta u} + \frac{l}{\delta v}\right)\right] + \cos\left[\pi\left(\frac{k}{\delta u} - \frac{l}{\delta v}\right)\right] \right\}$$

where k and l represent the indices of the discrete points after digitalization, x(k,l) represents the digitalized image of the initial unprotected original document, z(k,l) represents the marking image, and $\delta u$ and $\delta v$ are the sampling periods along the two axes of the original image.

5. A method as in claim 2, characterised in that the mark is incorporated into the original by mixing additively the original image and the marking image, by adding the samples of the two images after previous multiplication of the marking image and of the original image in accordance with the following Equation;

$$y(k,l) = x(k,l) + [z(k,l) - \alpha x(k,l)] \left\{ \cos\left[\pi\left(\frac{k}{\delta u} + \frac{l}{\delta v}\right)\right] + \right.$$

$$\cos\left[\pi\left(\frac{k}{\delta u} - \frac{l}{\delta v}\right)\right]\right\}$$

where k and l represent the indices of the discrete points after digitalization, x(k,l) represents the digitalized image of the initial unprotected original document, z(k,l) represents the marking image, and δu and δv are the sampling periods along the two axes of the original image.

6. A method as in claim 1, characterised in that the mark is incorporated into the original by mixing additively the original image which is to be protected and the marking image which is to be concealed in the original, by a Fourier transform manipulation.

7. A method as in claim 6, characterised in that the mark is incorporated into the original by introducing the marking image into the domain of the Fourier transform, by placing the Fourier transform of the marking image at the ends of the Fourier transform of the original image.

8. A method as in claim 6, characterised in that the mark is incorporated into the original by introducing the marking image into the domain of the Fourier transform, by placing the Fourier transform of the marking image at the ends of the Fourier transform of the original image, and by subtracting the corresponding quadrants of the Fourier transform of the original image.

9. A method as in claim 6, characterised in that the mark is incorporated into the original by introducing the marking image into the domain of the Fourier transform, by placing the Fourier transform of the marking image at the ends of the Fourier transform of the original image, and by subtracting the corresponding quadrants of the Fourier transform of the original image in a weighted manner.

10. A method as in claim 2, characterised in that the user may freely choose the marking image which he desires to introduce into the original image.

11. A method as in claim 6, characterised in that the user may freely choose the marking image which he desires to introduce into the original image.

* * * * *

UNITED STATES PATENT AND TRADEMARK OFFICE
CERTIFICATE OF CORRECTION

PATENT NO. : 5,524,933
DATED : June 11, 1996
INVENTOR(S) : Murat Kunt et al.

It is certified that error appears in the above-identified patent and that said Letters Patent is hereby corrected as shown below:

In column 6, line 15, before the word "photocopier", please insert the word --digital--.

Signed and Sealed this

Fourteenth Day of January, 1997

Attest:

BRUCE LEHMAN

Attesting Officer

Commissioner of Patents and Trademarks